(12) United States Patent
Little

(10) Patent No.: US 7,912,945 B2
(45) Date of Patent: Mar. 22, 2011

(54) EXCHANGE OF MANAGEMENT INFORMATION VIA APPLICATION MESSAGES

(75) Inventor: Mark Cameron Little, Ebchester (GB)

(73) Assignee: Red Hat, Inc., Raleigh, NC (US)

(*) Notice: Subject to any disclaimer, the term of this patent is extended or adjusted under 35 U.S.C. 154(b) by 306 days.

(21) Appl. No.: 11/998,561

(22) Filed: Nov. 30, 2007

(65) Prior Publication Data

US 2009/0144355 A1    Jun. 4, 2009

(51) Int. Cl.
*G06F 15/173* (2006.01)
(52) U.S. Cl. ........................ 709/224; 709/236
(58) Field of Classification Search .................. 709/223, 709/224, 236
See application file for complete search history.

(56) References Cited

U.S. PATENT DOCUMENTS

2002/0107949 A1* 8/2002 Rawson, III ................. 709/223
2003/0009545 A1* 1/2003 Sahai et al. .................. 709/223

OTHER PUBLICATIONS

"JBossESB Requirements and Architecture, Version: 0.3," May 2, 2006, 12 pages.
King, Erik, "Perpetual Enterprise Management Service (PEMS) for Next Generation SOA-based Command & Control Systems", Jun. 2005, 49 pages.
"Why ESB and SOA?" Version 0.3, Date: Jan. 27, 2006, 7 pages.

* cited by examiner

Primary Examiner — David Lazaro
(74) *Attorney, Agent, or Firm* — Blakely, Sokoloff, Taylor & Zafman LLP

(57) ABSTRACT

A message addressed to an application operating on a destination machine is received at an intermediate machine. Management information is attached to the message, the management information including operating statistics of the intermediate machine. The message is forwarded to the destination machine.

20 Claims, 5 Drawing Sheets

EXCHANGE OF MANAGEMENT INFORMATION VIA APPLICATION MESSAGES

TECHNICAL FIELD

Embodiments of the present invention relate to distributed systems, and more specifically to exchanging management information between machines in a service oriented architecture.

BACKGROUND

Each machine within a distributed computing system typically includes a management application that monitors the activities and operating conditions of other applications, services and machines in the distributed computing system. To effectively monitor such activities and operating conditions, the management applications periodically exchange management information with other management applications via management messages. A management message is generated by a management application at an application level (e.g., of the internet control message protocol (ICMP) or the open systems interconnection basic reference model (OSI model)), and includes operating statistics of a machine on which the management application operates and/or applications and services that operate on the machine. Examples of information included in management messages include how long a service has been active, how many users a service has had, the number of services and clients active on a machine, computing power of the machine, the present and past workload of a service, software versions of the service, etc. The exchange of management messages consumes bandwidth of the distributed computing system.

BRIEF DESCRIPTION OF THE DRAWINGS

The present invention is illustrated by way of example, and not by way of limitation, in the figures of the accompanying drawings and in which.

DETAILED DESCRIPTION

Figure 1:
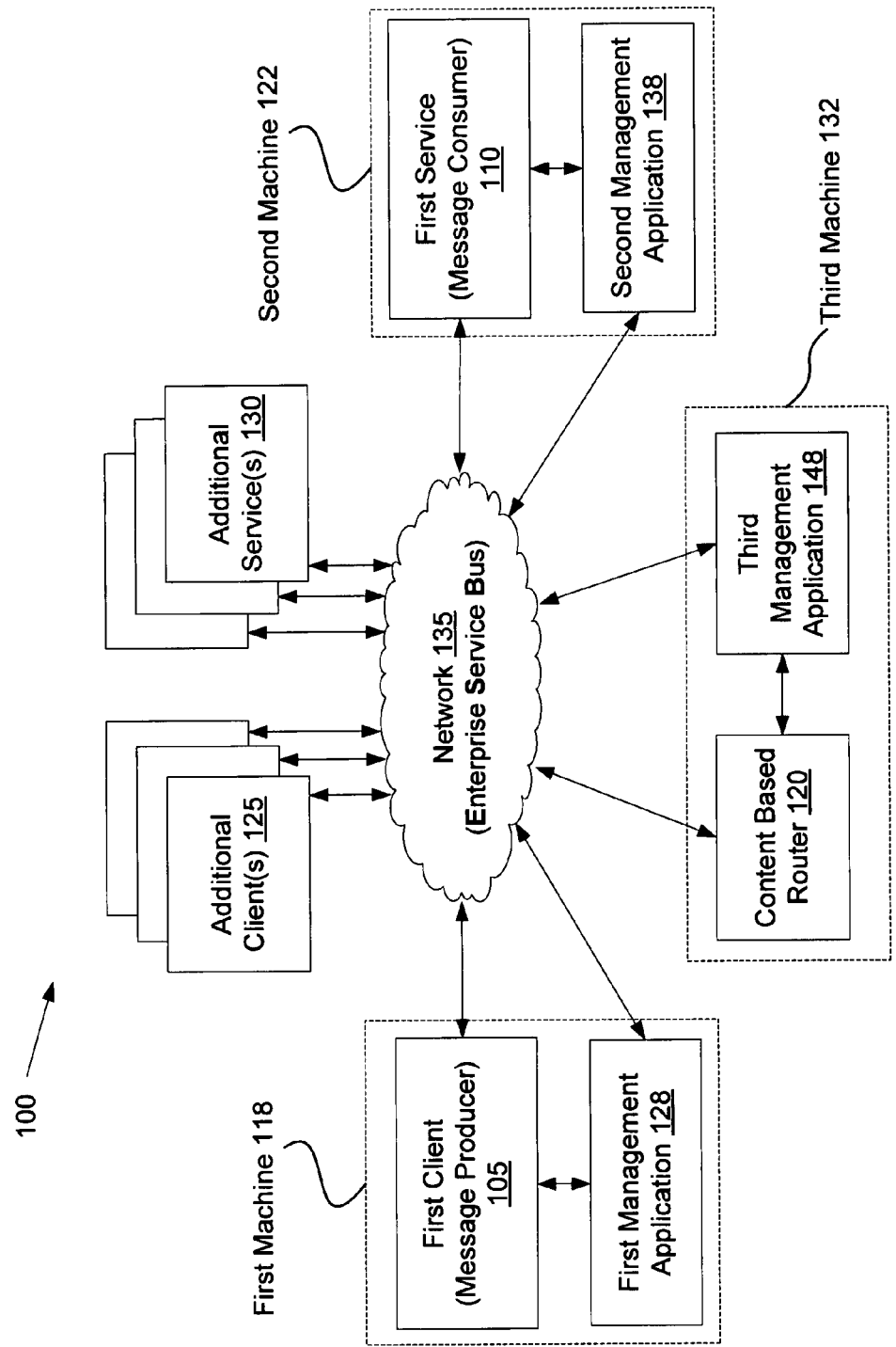
FIG. 1 illustrates an exemplary distributed computing system, in which embodiments of the present invention may operate.

Described herein is a method and apparatus for appending management information to messages that flow through a distributed computing system. In one embodiment, a message addressed to an application operating on a destination machine is received at an intermediate machine. Management information is attached to the message, the management information including operating statistics of the intermediate machine. The message is then forwarded to the destination machine. The message may be received at multiple different intermediate machines as it flows through a distributed computing system. Each of the intermediate machines may add management information to the message. In one embodiment, an amount of management information attached to the message is proportional to a number of machines through which the message has flowed. Upon processing the message, the destination machine may generate a response message, and attach the management information to the response message. The response message may then be transmitted back to a source machine that generated the message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include multiple machines (e.g., first machine 118, second machine 122 and third machine 132) connected via a network 135. Each of the machines may be a notebook computer, desktop computer, server, cellular phone, or other computing device. Each machine may include one or more services (e.g., first service 110 and additional services 130) and/or clients (e.g., first client 105 and additional clients 125) that operate on the machine. Each machine may also include a management application (e.g., first management application, second management application, and third management application 148) that operates on the machine, and is connected with clients and/or services that operate on the same machine.

In one embodiment, first client 105 operates on a first machine 118, first service 110 operates on a second machine 122, and content based router 120 operates on a third machine 132. In a further embodiment, additional clients 125 and/or additional services 130 operate on the first machine 118, second machine 122 and/or third machine 132. In another embodiment, first client 105, first service 110 and/or content based router 120 may operate on the same machine (e.g., they may all operate on first machine 118).

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 110, 130 and clients 105, 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 105 and 125 are applications that run on machines. In the SOA, clients 105 and 125 include applications that access services 110 and 130. Clients 105 and 125 may be fat clients (clients that perform local processing and data storage), thin clients (clients that perform minimal or no local processing and minimal to no data storage), and/or hybrid clients (clients that perform local processing but little to no data storage).

Services 110 and 130 may be discretely defined sets of contiguous and autonomous functionality (e.g., business functionality, technical functionality, etc.). Each service 110 and 130 may represent a process, activity or other resource that can be accessed and used by other services or clients on network 135. Each service 110 and 130 may be independent of other services 110 and 130, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

Each of the clients 105 and 125 and services 110 and 130 may be both message producers and message consumers. In the illustrated embodiment, the first client 105 is a message producer, and the first service 110 is a message consumer. Alternatively, additional clients 125, first service 110 or additional services 130 may be message producers, and/or first client 105, additional clients 125, or additional services 130 may be message consumers.

A message producer is a client or service that generates a message. Messages include data that may convey information to, or initiate an event on, a message consumer (e.g., a service or client). A message may be generated for any of a myriad of purposes. For example, the message may be generated to report a purchase of a good, to request contact information, to begin a remote process (e.g., initiate a service), etc.

A message consumer receives a message generated by a message producer, and sent to an address (e.g., service address or client address) of the message consumer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

Each service may have a service address to which messages directed to the service are sent. The service address is included in a header of a message. A format of the service address may depend on a transport mechanism used by the service. For example, if the transport mechanism is HTTP or FTP, then the service address may include a host number and a port number. If, on the other hand, the transport mechanism is JMS, the service address may be a JMS queue number. If a message is sent to an incorrect service address, a message cannot be processed by the service.

In one embodiment, the distributed computing system 100 includes content based router 120. The content based router 120 is a service of the ESB that monitors the network 135 for messages, and transparently routes the messages between clients and services.

In one embodiment, the content based router 120 acts as a forwarder for one or more services (e.g., first service 110) on an ESB. When the content based router 120 intercepts a message from a message producer (e.g., first client 105), the content based router 120 may examine a header and/or other contents of the message to determine whether it is directed to an active service address or addresses of the service. Those messages directed to a specific service address that is no longer active may be forwarded to a specified different service address. A service may therefore receive messages that are sent to old service addresses that are no longer active. For example, content based router 120 may be set to forward all messages addressed to a first (old) service address of first service 110 to a second (new) service address of first service 110. First service 110 may therefore be moved as necessary without inconvenience to clients 105, 125.

In another embodiment, content based router 120 acts as a switchboard, directing some or all message traffic between clients 105, 125 and services 110, 130. In such an embodiment, some or all messages may be directed to the content based router 120. A client 105, 125 may not need to know a service address of an intended service to send a message to it. Instead, a client may only need to know a name or other identifying information of the service 110, 130. Content based router 120 may then direct incoming messages to appropriate services based on service names or other identifying information.

In one embodiment, first machine 118, second machine 122 and third machine 132 include first management application 128, second management application 138 and third management application 148, respectively. Management applications may gather operating statistics of applications and/or services to which the management applications are connected (e.g., those applications and services that operate on a machine on which a management application operates). For example, first management application may collect operating statistics of first client 105, third management application may collect operating statistics of content based router 120, etc. Management applications may collect data on, for example, how long a service has been active, how many clients have used a service, the current and past workload of a service, software versions being used by an application or service, etc. Management applications may also gather operating statistics of the machine on which the management application operates (e.g., how long the machine has been active, number of services operating on the machine, machine capabilities, etc.).

In one embodiment, a management application attaches management information to outgoing messages (whether those messages were generated by a local application or service, or whether the messages were generated by an application/service on a remote machine. When those messages are received at another machine, a management application that operates on the other machine may copy the received management information, and/or remove the received management information form the message. That other machine may then attach additional management information to the message before forwarding it on to yet another machine (e.g., to a machine on which a destination application operates). Management applications therefore may use existing messages as a medium for exchanging management information. The amount of management information that is added to a message may depend on a number of machines that receive a message, and/or a number of services, clients, etc. that operate on the machines.

In one embodiment, management applications also generate management messages that query other management applications about services and/or clients operating on other machines. Such queries may be sent, for example, if a management application lacks recent data on specified services or applications running on a remote machine. Management messages may also include management information that has been attached by the sending management application.

Figure 2:
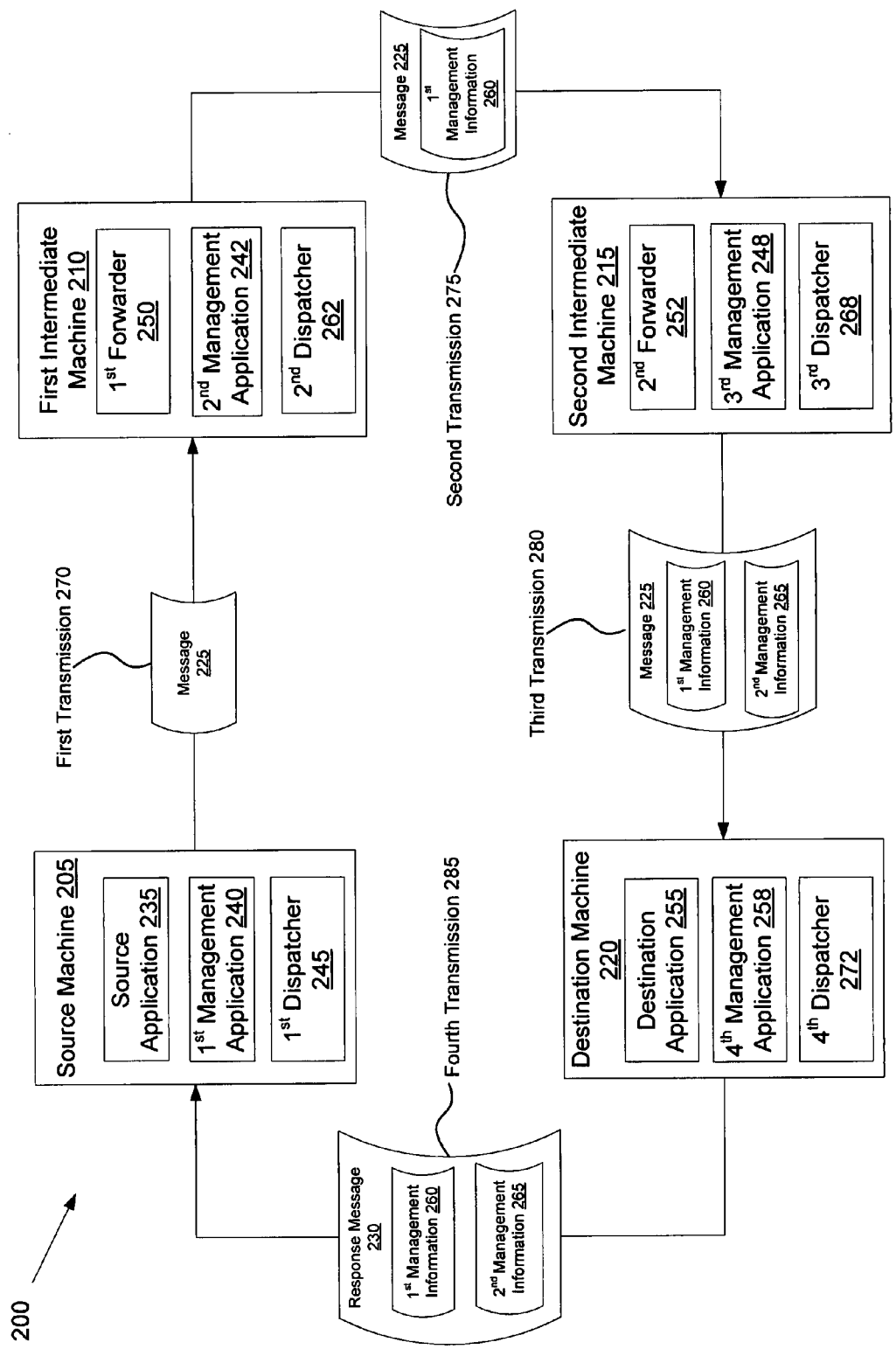
FIG. 2 illustrates a data flow diagram showing a message flowing through a distributed computing system, in accordance with one embodiment of the present invention.

FIG. 2 illustrates a data flow diagram 200 showing a message flowing through a distributed computing system, in accordance with one embodiment of the present invention. In one embodiment, the distributed computing system corresponds to distributed computing system 100 of FIG. 1.

Returning to FIG. 2, a source machine 205 includes a source application 235, a first management application 240 and a first dispatcher 245. A dispatcher is a service that receives a message as an input, and outputs the message. Dispatchers may be configured to perform operations on all messages that they receive. Alternatively, dispatchers may examine each received message and determine whether or not to operate on it based on, for example, a rules engine and accompanying rules. Dispatchers may determine where the messages are addressed to, and operate on the message or perform an action based on the addressee. Dispatchers may also examine the contents of the message, and determine whether to operate on the message based on identified contents. For example, a dispatcher may be configured only to operate on messages having a specific time stamp, or including specific information.

The source application 235 generates a message 225 directed to a destination application 255, and sends it to a first intermediate machine 210 in a first transmission 270. In one embodiment, the management application 240 attaches management information to the message 225. The management information may be unrelated with a purpose and/or body of the message. For example, the message 225 may be to process a credit card transaction, and the management information may include operating statistics on a source machine 205. In another embodiment, first management application 240 directs dispatcher 245 to attach management information to the message 225. For example, first management application 240 may periodically or continuously forward management information to first dispatcher 245. When a new message is ready to be transmitted, first dispatcher 245 may attach latest management information that it has received from first management application 240. In yet another embodiment, source application 235 attaches management information to message 225. For example, source application 235 may periodically be provided with management information from first management application 240, which source application 235 may attach to messages that it generates. Alternatively, no management information may be attached to the message at the source machine 205.

In one embodiment, first intermediate machine 210 is a machine on which destination application 255 once operated. Alternatively, first intermediate machine 210 may be a router, gateway, or other processing device configured to receive and transmit messages. First intermediate machine 210 includes a first forwarder 250, a second management application 248 and a second dispatcher 262. In one embodiment, second dispatcher 262 receives message 225 and forwards it to first forwarder 250. If any management information were attached to message 225, second dispatcher 262 could copy the management information and forward it to second management application 242.

First forwarder 250 forwards the message 225 to a second intermediate machine 215 in a second transmission 275. First forwarder 250 may have been installed at the first intermediate machine 210 to forward messages that are directed to a destination application 255 that once operated on the first intermediate machine 210. Such messages may be forwarded to a second intermediate machine 215 to which the destination application 220 was migrated. The first forwarder 250 may be a simple forwarder that is configured to forward all received messages to second intermediate machine 215. First forwarder 250 may forward messages to the second intermediate machine 215 regardless of message context, message header, or other message content. Moreover, first forwarder 250 may forward messages to second intermediate machine 215 without examining the messages. Alternatively, first forwarder 250 may examine messages to determine where they should be forwarded. For example, first forwarder 250 may include a list of forwarding addresses for multiple different services that once operated on first intermediate machine 210. Upon receipt of message 225, first forwarder 250 may examine message 225 to determine that message 225 is directed to destination application, and find an entry in the list of forwarding addresses that directs first forwarder 150 to forward message 225 to second intermediate machine 215.

In one embodiment, second management application 242 attaches first management information 260 to the message 225. The first management information 260 may include operating statistics on one or more services and/or applications that operate on first intermediate machine 210. The first management information 260 may also include operating statistics of the first intermediate machine 210. Alternatively, second management application 215 may direct second dispatcher 262 to attach first management information 260 to the message 225.

Second intermediate machine 215 receives message 225 in second transmission 275. In one embodiment, third dispatcher 258 receives messages. Third dispatcher 268 can then copy first management information 260, and forward it to third management application 248. Third dispatcher can also forward message 225 to second forwarder 252.

Third management application 248 stores first management information 260 (e.g., in a local or remote data store). Third management application 248 may attach second management information 265 pertaining to second intermediate machine 215 and/or services/applications running on second intermediate machine 215 to the message 225. Alternatively, third dispatcher 268 or second forwarder 252 may attach the second management information 265 to message (e.g., if second forwarder 252 or third dispatcher 268 periodically receives updated management information from third management application 248). Second forwarder 252 then forwards the message 225 to a destination machine 220 in a third transmission 280.

Destination machine 220 receives message 225. Destination machine 220 includes a fourth dispatcher 272, a destination application 255, and a fourth management application 258. In one embodiment, fourth dispatcher 272 receives the message 225, and removes the first management information 260 and second management information 265 from the message 225. Fourth dispatcher 272 then forwards message 225 to destination application 255, and forwards first management information 260 and second management information 265 to fourth management application 258. If the destination application 255 were to receive the message 225 with the management information attached, the destination application 255 may not be able to process the message 225. Alternatively, destination application 255 may discard the attached management information, and process the message 225. By intercepting the message 225 prior to receipt by destination application 255, fourth dispatcher 272 can ensure that the first management information 260 and second management information 265 will not be lost.

Fourth management application 258 stores first management information 260 and second management information 265 (e.g., in a data store). Destination application 255 processes message 225, or places it on a message queue for future processing, upon receiving the message 225. Once destination application 255 has processed message 225, destination application 255 generates a response message 230 and sends the response message 230 to source application 235 in a fourth transmission 285. In one embodiment, fourth management application 258 attaches first management information 260 and second management information 265 to the response message 230. Alternatively, fourth dispatcher 272 may attach first management information 260 and second management information 265 to response message 230.

Upon source machine 205 receiving response message 230, first dispatcher 245 removes the first management information 260 and second management information 265 (and any additional management information) from the response message 230. First dispatcher 245 then forwards the first management information 260 and second management information 265 to first management application 240, and forwards response message 230 to source application 235. Source application 235 can then process response message 230.

By adding management information to messages that are otherwise flowing through a distributed computing system, management applications can exchange management information without requiring the generation or transmission of additional messages. This can reduce network traffic without reducing an amount of management information that is exchanged. An amount of management information that is attached to a message as it flows through machines of the distributed computing system may be proportional to the number of machines through which it flows. The amount of management information attached to a message may also be proportional to a number of services that operate on the machines through which the message flows.

Figure 3:
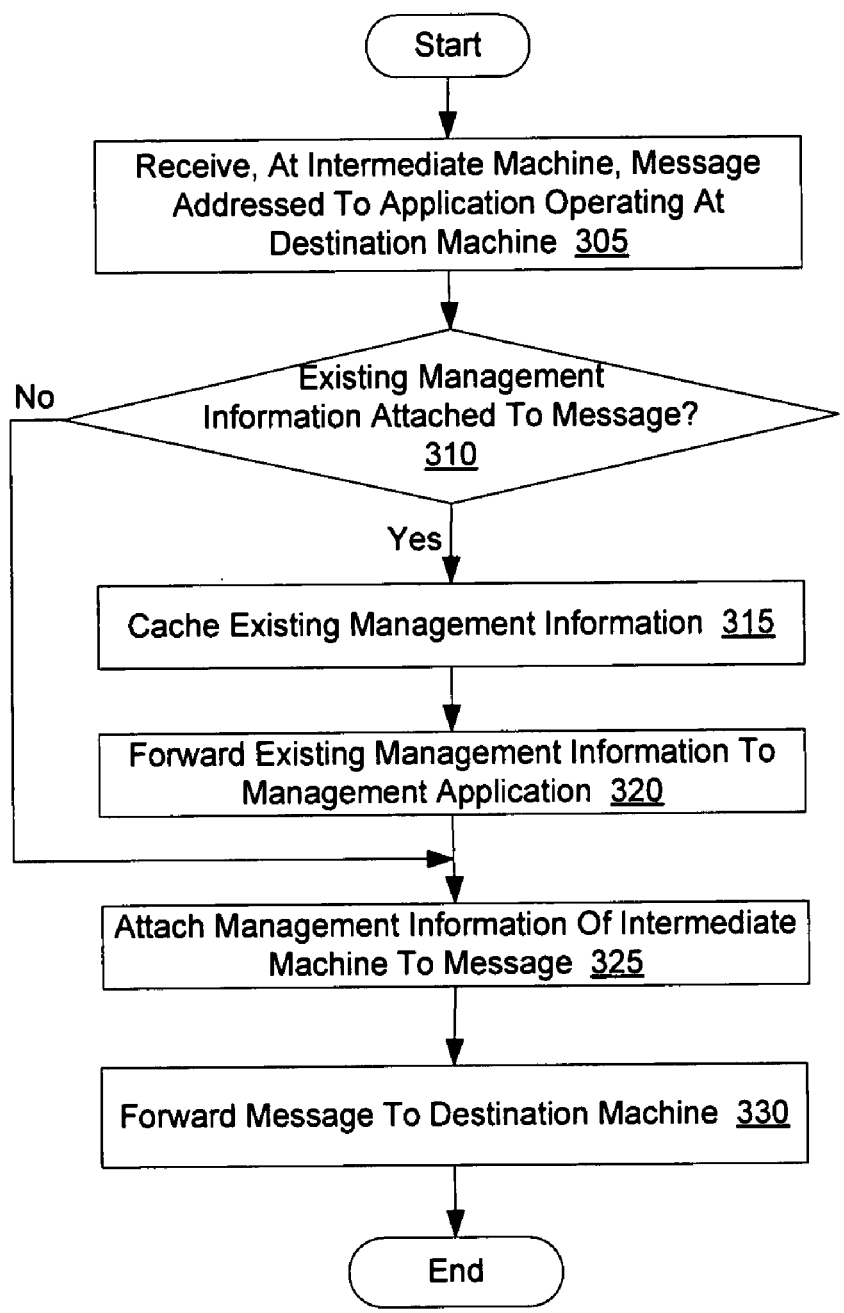
FIG. 3 illustrates a flow diagram of one embodiment for a method of exchanging management information between machines in a distributed computing system.

FIG. 3 illustrates a flow diagram of one embodiment for a method 300 of exchanging management information between machines in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 300 is performed by a machine of distributed computing system 100 of FIG. 1.

Referring to FIG. 3, method 300 includes receiving a message at in intermediate machine (block 305). In one embodiment, the intermediate machine includes a content based router that receives the message. In another embodiment, the intermediate machine may include a forwarder that receives the message. Alternatively, the intermediate machine may include a router, gateway, or other computing device through which messages may flow in a distributed computing system. The received message is addressed to an application or service operating at a destination machine.

At block 310, processing logic determines whether existing management information is attached to the message. Such a determination may be made, for example, by a dispatcher or other application. If existing management information is attached to the message, the method continues to block 315.

If no existing management information is attached to the message, the method proceeds to block 325.

At block 315, the existing management information is cached at the intermediate machine. Caching the existing management information may include storing the management information in a data store. At block 320, the existing management information is forwarded to a management application that runs on the intermediate machine.

At block 325, processing logic attaches management information of the intermediate machine to the message. The management information may include operating statistics of the machine and/or of applications and services running on the machine. The management information may be attached by a dispatcher, the management application, a forwarder, a content based router, or some other application. At block 330, the message is forwarded to a destination machine.

Figure 4:
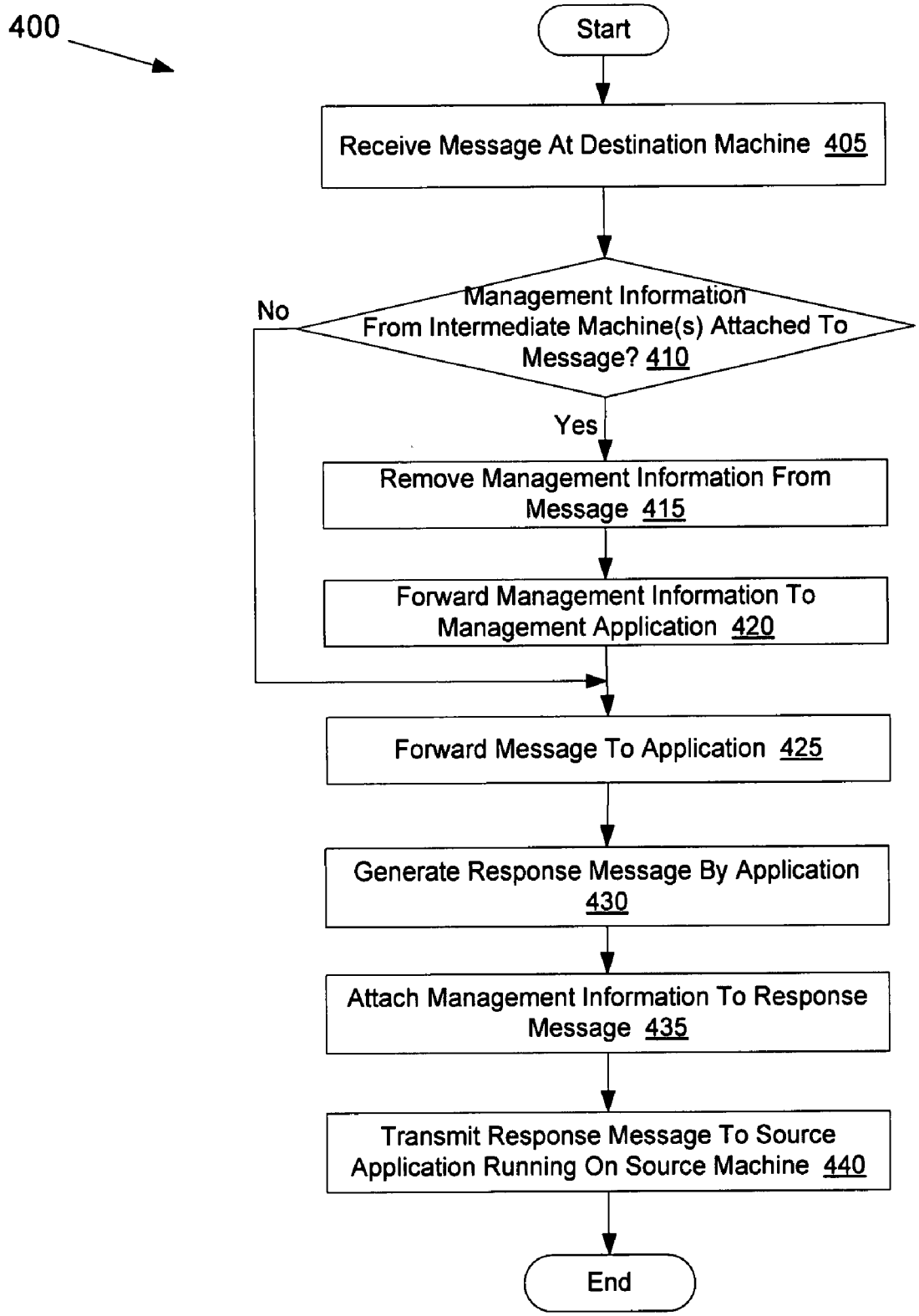
FIG. 4 illustrates a flow diagram of another embodiment for a method of exchanging management information between machines in a distributed computing system.

FIG. 4 illustrates a flow diagram of another embodiment for a method 400 of exchanging management information between machines in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 400 is performed by a machine of distributed computing system 100 of FIG. 1.

Referring to FIG. 4, method 400 includes receiving a message at a destination machine (block 405). The message may be addressed to an application or service that operates on the destination machine. At block 410, processing logic determines whether management information from intermediate machines is attached to the message. If no management information is attached to the message, the method proceeds to block 425. If management information is attached to the message, the method continues to block 415.

At block 415, the management information is removed from the message. The management information may be removed by a dispatcher (e.g., dispatcher 245 of FIG. 2). At block 420, the management information is forwarded to a management application that operates on the destination machine. At block 425, the message is forwarded to the application to which it is addressed.

At block 430, a response message is generated. At block 435, management information is attached to the message. The management information may be attached to the message by the management application, or by a dispatcher. Alternatively, the management information may be attached to the response message by the application. Additional management information that pertains to the destination machine and/or to applications and services that run on the destination machine may also be attached to the response message. At block 440, the response message is transmitted to a source application that generated the original message. The method then ends.

Figure 5:
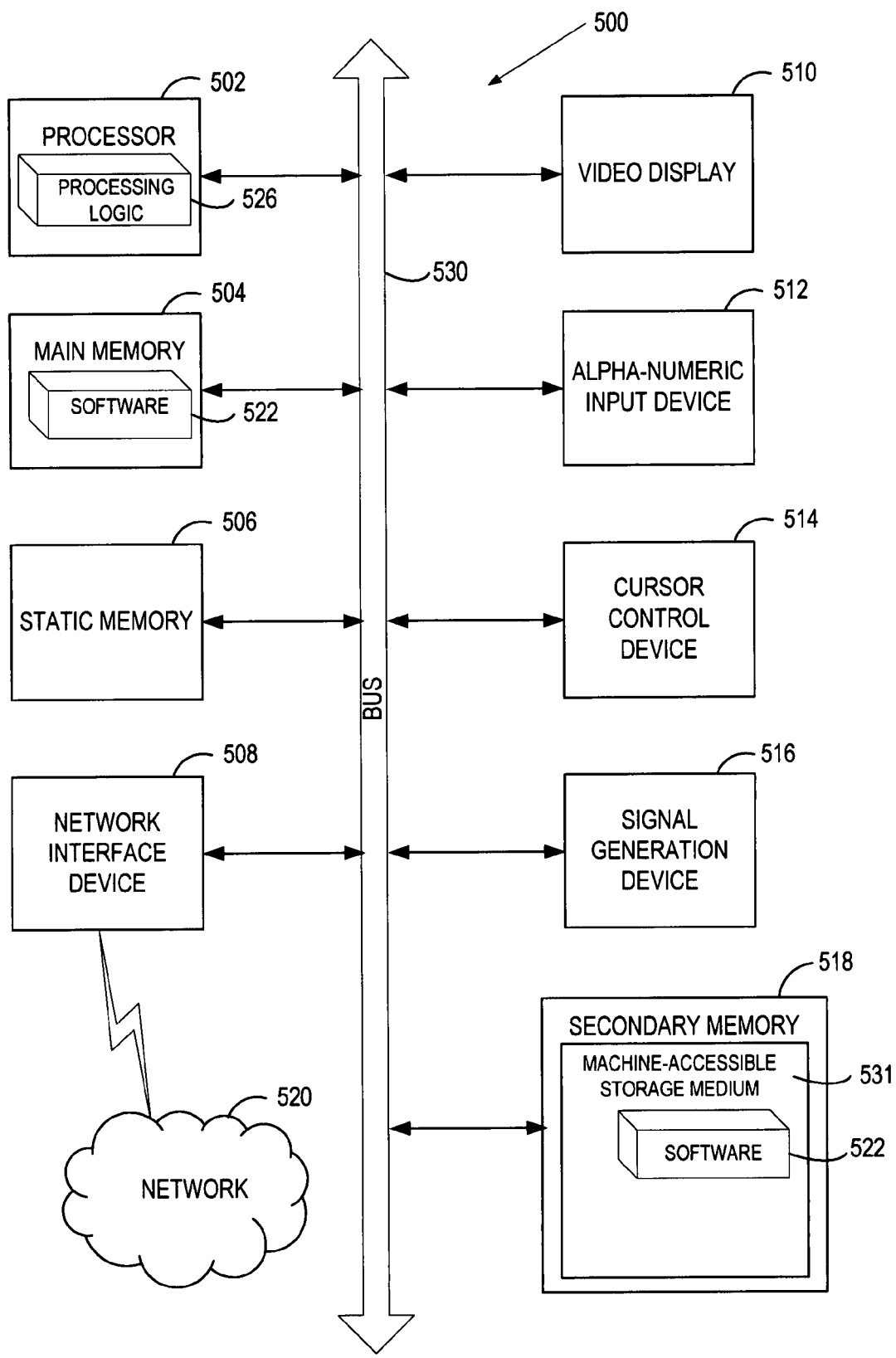
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store a dispatcher and/or application manager (e.g., the first dispatcher 245 and first management application 240 of FIG. 2), and/or a software library containing methods that call management applications and/or dispatchers. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium"

shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
   receiving a message from a source application operating on a source machine at an intermediate machine in a distributed computing environment that includes a service oriented architecture, wherein the source machine has a source address that is different from an intermediate address of the intermediate machine, wherein the message is addressed to a destination application operating on a destination machine, wherein the message is associated with a transaction that includes the source application operating on the source machine and the destination application operating on the destination machine, and wherein the transaction between the source application and the destination application does not include any application, running on the intermediate machine, that participates in the transaction;
   attaching management information to the message, the management information including operating statistics of the intermediate machine; and
   forwarding the message to the destination machine.

2. The method of claim 1, further comprising:
   caching existing management information that was attached to the message by a previous intermediate machine; and
   forwarding the existing management information to a management application operating on the intermediate machine.

3. The method of claim 1, wherein the management information is unrelated to the message.

4. The method of claim 1, wherein the management information includes operating statistics of one or more services running on the intermediate machine.

5. A computer implemented method, comprising:
   receiving a message at a destination machine in a distributed computing environment that includes a service oriented architecture, the message addressed to a destination application running on the destination machine, wherein the message was generated by a source application running on a source machine having a source address and has flowed through one or more intermediate machines having intermediate addresses that are distinct from the source address, wherein at least one of the one or more intermediate machines attached management information to the message, the management information pertaining to operating statistics of the at least one intermediate machine, wherein the message is associated with a transaction that includes the destination application running on the destination machine and the source application running on the source machine, and wherein the transaction between the destination application and the source application does not include any application, running on the at least one intermediate machine, that participates in the transaction;
   removing the management information from the message;
   forwarding the management information to a management application that runs on the destination machine; and
   forwarding the message to the destination application.

6. The method of claim 5, further comprising:
   generating a response message;
   attaching the management information to the response message; and
   transmitting the response message to the source application running on the source machine.

7. The method of claim 6, further comprising:
   attaching additional management information to the response message, the additional management information including operating statistics of the destination machine.

8. The method of claim 5, wherein an amount of management information attached to the message is proportional to a number of machines through which the message has flowed.

9. The method of claim 5, wherein the management information is unrelated with the message.

10. The method of claim 5, wherein the management information includes operating statistics of one or more services running on the one or more intermediate machines.

11. A non-transitory computer readable medium including instructions that, when executed by a processing system, cause the processing system to perform a method comprising:
    receiving a message from a source application operating on a source machine at a current machine in a distributed computing environment that includes a service oriented architecture, the message being addressed to a destination application, wherein the message has flowed through one or more intermediate machines having intermediate addresses that are distinct from a source address of the source machine, wherein at least one of the one or more intermediate machines attached management information to the message, the management information pertaining to operating statistics of the at least one intermediate machine, wherein the message is associated with a transaction that includes the destination application and the source application, and wherein the transaction between the destination application and the source application does not include any applications, running on the one or more intermediate machines, that participate in the transaction;
    determining if the destination application runs on the current machine;
    if the destination application runs on the current machine, removing the management information from the message, forwarding the management information to a management application that runs on the current machine, and forwarding the message to the destination application; and
    if the destination application does not run on the current machine, attaching additional management information to the message, and forwarding the message to a destination machine on which the destination application runs.

12. The non-transitory computer readable medium of claim 11, the method further comprising:
    if the destination application runs on the current machine, generating a response message, attaching the management information to the response message, and transmitting the response message to the source application running on the source machine, wherein the source application generated the message.

13. The non-transitory computer readable medium of claim 11, wherein an amount of management information attached to the message is proportional to a number of machines through which the message has flowed.

14. The non-transitory computer readable medium of claim 11, wherein the management information is unrelated with the message.

15. The non-transitory computer readable medium of claim 11, wherein the management information includes operating statistics of one or more services running on the one or more intermediate machines.

16. A distributed computing system that includes a machine connected with a network, the machine comprising:
   a memory, including instructions for a dispatcher, a destination application and a management application; and
   a processing device, connected with the memory, to execute the instructions, wherein the instructions cause the processing device to include:
      the dispatcher, to receive a message directed to a destination application, wherein the message was generated by a source application running on a source machine having a source address and has flowed through one or more intermediate machines having intermediate addresses that are distinct from the source address, wherein at least one of the one or more intermediate machines attached management information pertaining to operating statistics of the at least one intermediate machine, wherein the message is associated with a transaction that includes the destination application and the source application, and wherein the transaction between the destination application and the source application does not include any application, running on the one or more intermediate machines, that participates in the transaction, the dispatcher further to remove the management information from the message, to forward the message to the destination application, and to forward the management information to a management application;
      the destination application, running one the machine, to receive the message, and to process the message; and
      the management application, running on the machine, to receive the management information.

17. The distributed computing system of claim 16, the machine further comprising:
   the destination application to generate a response message, and to transmit the response message to the source application running on the source machine, wherein the source application generated the message; and
   the dispatcher to attach the management information to the response message.

18. The distributed computing system of claim 16, wherein the dispatcher to attach additional management information to the response message, the additional management information including operating statistics of the machine.

19. A distributed computing system that includes an intermediate machine connected with a network, the intermediate machine comprising:
   a memory, including instructions for a forwarder and a management application; and
   a processing device, connected with the memory, to execute the instructions, wherein the instructions cause the processing device to include:
      the management application, to supply management information to the forwarder; and
      the forwarder, to receive a message generated by an application running on a source machine and directed to a destination application running on a destination machine, wherein the source machine has a source address that is distinct from an intermediate address of the intermediate machine, to attach management information pertaining to operating statistics of the intermediate machine to the message, and to forward the message to the destination machine, wherein the message is associated with a transaction that includes the source application running on the source machine and the destination application running on the destination machine, and wherein the transaction between the source application and the destination application does not include any application, running on the intermediate machine, that participates in the transaction.

20. The distributed computing system of claim 19, wherein the message has flowed through one or more intermediate machines, and wherein at least one of the one or more intermediate machines attached additional management information pertaining to operating statistics of the one or more intermediate machines, further comprising:
   the forwarder to forward the additional management information to the management application.

* * * * *